No. 697,918. Patented Apr. 15, 1902.
E. KEMPSHALL.
GOLF BALL.
(Application filed Jan. 8, 1902.)
(No Model.)
Fig.1.
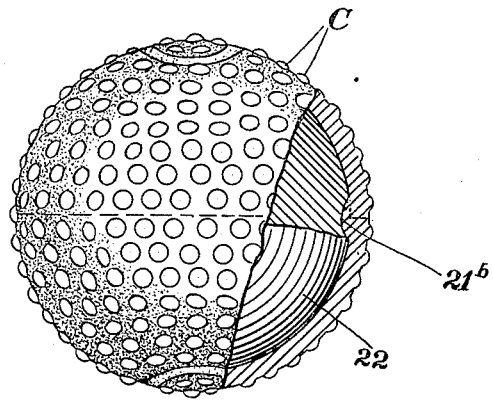
Fig.2.
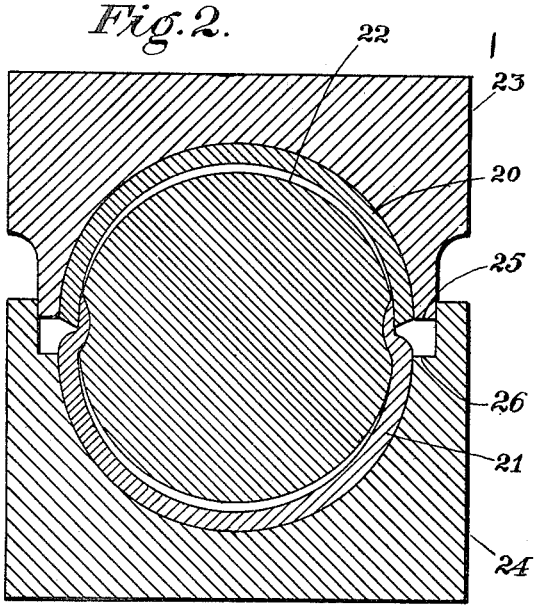
Fig.3.
Fig.4.
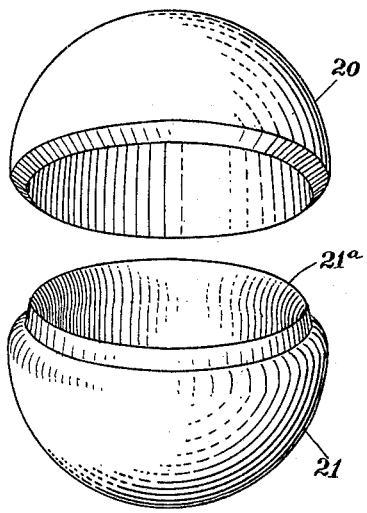
Witnesses:
Robert Head
E. A. Jarvis.
Inventor:
Eleazer Kempshall,
By his Attorney,
F. A. Richards.

UNITED STATES PATENT OFFICE.

ELEAZER KEMPSHALL, OF BOSTON, MASSACHUSETTS, ASSIGNOR TO THE KEMPSHALL MANUFACTURING COMPANY, A CORPORATION OF NEW JERSEY.

GOLF-BALL.

SPECIFICATION forming part of Letters Patent No. 697,918, dated April 15, 1902.

Application filed January 8, 1902. Serial No. 88,824. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Golf-Balls, of which the following is a specification.

This invention relates to playing-balls; and its chief object is to improve the construction of the shell, which is made in segments welded together under compression upon a yielding filling or core. I provide an improved joint between the shell-sections, whereby the elastic core is effectually confined at the welding or joining operation, the area of the welding-surfaces or joint is increased, and the shell and core are also anchored together.

In the drawings forming part of this specification, Figure 1 is a completed ball partly broken away, so as to disclose the construction. Fig. 2 illustrates a stage in the manufacture of the ball, and Figs. 3 and 4 are perspective views of the upper and lower hemispheres of a shell-blank.

Similar parts in the several figures are designated by similar characters of reference.

I preferably employ hemispherical blanks or half-blanks 20 and 21 to form a shell or cover for a filling or core 22. The material of the shell is generally hard and stiff and such that it may be rendered plastic, as by means of heat, and subsequently rehardened. The filling is relatively soft or yielding and elastic and preferably of material which is not injured by heat which is sufficient to render the shell plastic. The center piece 22 may be first formed of the required size and shape and is oversize or too bulky for the capacity of the finished shell.

Upon the inner border of the edge of the lower hemispherical blank 21 I form a brim $21^a$, over which the upper blank 20 may fit snugly, the core 22 having first been inserted within the blank 21, as at Fig. 2. The parts thus assembled I place between telescopic heating and molding dies 23 and 24, which are forced together upon the ball, thereby compressing the filling, compacting the material of the shell, which is rendered plastic by the heat, and also forming a strong weld of the upper to the lower half-blanks. The tendency of the elastic core to squeeze out at the closing action of the dies is frustrated by the overlapping brim $21^a$, which for this purpose is made to extend a considerable distance within the upper shell 20. Should any of the material of the plastic shell squeeze out between the approaching lips 25 and 26 of the dies, it is forced or squeezed back again toward the interior of the ball at the final closing action of the dies, and such kneading of the material improves the efficiency of the weld. The contacting portions of the brim $21^a$ and the half-shell 20 also offer extra welding surfaces or material, or, in other words, the area of the welded surface is increased. The material of the brim $21^a$ after the ball is finished forms upon the inside of the shell a welt or bead, as at $21^b$, Fig. 1, which belts the filling and anchors the same to the shell, thus reducing the liability of disruption of the latter from the filling under the impact of an implement. If desired to make this internal bead extra thick, material may be added at the edges of the segments 20 and 21, which after being rendered plastic will be squeezed inwardly by the closing of the dies.

By the described operation the filling is placed under permanent compression by the shell, and the latter is tempered or solidified and strengthened, so that a ball of exceptionally effective and durable quality is produced.

It will be seen that my invention is also of value in cases where the segments are intended to be held together by cement without welding, in which event the edges of the segments 20 and 21 will be made to match instead of being oppositely chamfered, as illustrated in the drawings. The upwardly-projecting brim $21^a$ furnishes extra adhering surface.

In case heating-dies are used the ball is allowed to cool and harden before being relieved of pressure, so that it may effectually retain the filling under compression.

In my pending application, Serial No. 79,773, filed October 24, 1901, I illustrate overlapping shell-segments, the present application being intended to cover the formation of an inwardly-swelling brim, which constricts the core and also forms a lap-joint.

I usually make the exterior surface of golf-balls pebbled or brambled, as at C, Fig. 1, and I prefer to make the shell wholly or largely of celluloid, which is compacted and tempered at the heating and compressing operation and rendered highly desirable for use in the game of golf, while the interior is preferably made wholly or largely of gutta-percha. By this means I produce a twofold springiness in the ball, enabling the elastic filling to coöperate with the springy shell, the efficiency of the filling being greatly augmented by having it under compression, since the expansive pressure thereof tends constantly to cause the shell to assume a spherical shape, so that the flying or carrying power of the ball is largely increased. In using the term "celluloid" I mean to include any suitable grade or compound of celluloid or pyroxylin material or its equivalent. The form and number of the segmental blanks may be varied within the scope of the invention.

While I prefer to use celluloid for the shell, still I consider within the scope of my invention a shell made of other material—such, for instance, as gutta-percha, provided it is formed in the manner herein set forth—and, if desired, soft rubber may be employed largely or wholly in the core, this material forming an excellent backing for a gutta-percha shell when held under compression thereby.

Having described my invention, I claim—

1. A playing-ball comprising a shell built up from lap-jointed sections, and a filling held under compression by said shell, the material of the lap at the joint between said sections forming a bead or welt around the interior of the shell.

2. A playing-ball comprising a shell built up of lap-jointed sections of stiff, springy material, and a filling of elastic material held under compression by said shell, said sections being welded together, and the material of the lap forming a bead or welt which creases the filling.

3. A playing-ball comprising hemispherical lap-jointed segments of celluloid welded and compacted, and a filling of elastic material held under compression by said shell, the material of the lap forming an interior welt or bead upon said shell.

4. A playing-ball comprising a celluloid shell made in lap-jointed segments welded together, and a filling consisting wholly or largely of gutta-percha held under compression by said shell; the material of the lap at said joint or weld forming a welt or bead upon the interior of the shell.

ELEAZER KEMPSHALL.

Witnesses:
B. C. STICKNEY,
JOHN O. SEIFERT.